US009277455B2

(12) United States Patent
Chen et al.

(10) Patent No.: US 9,277,455 B2
(45) Date of Patent: Mar. 1, 2016

(54) FLOW-BASED CALL ADMISSION CONTROL FOR WIRELESS COMMUNICATION SYSTEMS

(75) Inventors: Pi-Chun Chen, Lake Hiawatha, NJ (US); Zhang Qinqing, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2897 days.

(21) Appl. No.: 11/121,877

(22) Filed: May 4, 2005

(65) Prior Publication Data

US 2006/0252429 A1   Nov. 9, 2006

(51) Int. Cl.
H04W 74/00 (2009.01)
H04W 28/24 (2009.01)

(52) U.S. Cl.
CPC ..................... H04W 28/24 (2013.01)

(58) Field of Classification Search
USPC ......................................................... 455/453
See application file for complete search history.

(56) References Cited

U.S. PATENT DOCUMENTS

| | | | |
|---|---|---|---|
| 5,497,504 A * | 3/1996 | Acampora et al. ............ 455/450 |
| 5,991,272 A * | 11/1999 | Key et al. ....................... 370/252 |
| 6,216,006 B1 * | 4/2001 | Scholefield et al. .......... 455/450 |
| 6,377,548 B1 * | 4/2002 | Chuah ............................ 370/233 |
| 6,477,373 B1 * | 11/2002 | Rappaport et al. ......... 455/452.1 |
| 6,931,251 B2 * | 8/2005 | Ramakrishnan et al. ..... 455/445 |
| 6,975,879 B1 * | 12/2005 | Aalto et al. .................... 455/522 |
| 6,985,439 B2 * | 1/2006 | Hosein .......................... 370/230 |
| 7,024,203 B1 * | 4/2006 | Naghian ....................... 455/453 |
| 7,089,017 B2 * | 8/2006 | Chen et al. .................... 455/453 |
| 7,385,920 B2 * | 6/2008 | Zhang et al. .................. 370/232 |
| 7,437,157 B1 * | 10/2008 | Satapathy ..................... 455/453 |
| 8,339,963 B2 * | 12/2012 | Babiarz et al. ............... 370/236 |
| 2001/0005359 A1 * | 6/2001 | Bergqvist ...................... 370/230 |
| 2002/0119783 A1 * | 8/2002 | Bourlas et al. ............... 455/453 |
| 2003/0064730 A1 * | 4/2003 | Chen et al. .................... 455/453 |
| 2003/0129988 A1 * | 7/2003 | Lee et al. ...................... 455/450 |
| 2003/0148768 A1 * | 8/2003 | Kakani et al. ................ 455/452 |
| 2004/0013089 A1 * | 1/2004 | Taneja et al. ................. 370/235 |
| 2004/0082338 A1 * | 4/2004 | Norrgard et al. ........... 455/452.2 |
| 2004/0141479 A1 * | 7/2004 | Cha et al. ...................... 370/329 |
| 2004/0213153 A1 * | 10/2004 | Nagato et al. ................ 370/230 |
| 2005/0059417 A1 * | 3/2005 | Zhang et al. .................. 455/515 |
| 2006/0133346 A1 * | 6/2006 | Chheda et al. ............... 370/352 |
| 2008/0137535 A1 * | 6/2008 | Zhang et al. .................. 370/234 |
| 2008/0318590 A1 * | 12/2008 | Franceschini et al. ........ 455/453 |

OTHER PUBLICATIONS

Kempf et al., "A Priority-based Distributed Call Admission Protocol for Multi-hop Wireless Ad hoc Networks," Jul. 2004.*

* cited by examiner

Primary Examiner — Marcos Batista
(74) Attorney, Agent, or Firm — Carlson, Gaskey & Olds, P.C.

(57) ABSTRACT

A wireless communication system (20) includes a call admission module (40) that determines whether to admit a new call based upon a flow of the new call. In a disclosed example, the call admission module (40) predicts a loading of a sector resulting from admission of the new flow. Provided that the new flow will fit within a sector capacity or there are sufficient resources that can be reallocated within the sector to accommodate the new flow and satisfy quality of service requirements for the new flow and existing flows, the new call will be admitted.

15 Claims, 2 Drawing Sheets

FLOW-BASED CALL ADMISSION CONTROL FOR WIRELESS COMMUNICATION SYSTEMS

FIELD OF THE INVENTION

This invention generally relates to telecommunications. More particularly, this invention relates to wireless communication systems.

DESCRIPTION OF THE RELATED ART

Wireless communication systems are well known and in widespread use. There are a variety of control functions that must be completed for a system to perform in a manner that meets quality of service (QoS) requirements. For example, it is important for a wireless communication system to maintain proper noise or interference controls so that mobile stations can communicate effectively with a base station transceiver. This concern is true in a variety of wireless communication systems.

The Code Division Multiple Access (CDMA) spread spectrum has become the major technology in 3G wireless communication systems. A CDMA system is interference-limited, especially for the reverse link (i.e., from the mobile station(s) to a base station transceiver). When multiple mobile stations transmit data to a base station, each mobile's received signal causes interference to those of other mobile stations. The total received power at the base station shall be controlled under a certain threshold to maintain the system stability. Known power control techniques are employed to control the received signal power from a mobile while maintaining a desired signal to noise ratio of that mobile.

The total interference level received at the base station is often measured by the so-called Rise over Thermal (RoT) ratio. It is the ratio of the total received power strength from all the mobiles to the thermal noise, which is often assumed to be at a constant level. The total received power at a base station includes the signals from the primary mobile users, the secondary mobile users who are in soft handoff, and the signals from mobiles in other cells. The goal is to keep the RoT level below a certain threshold to maintain the system stability. For example, the average RoT can be set at 5.5 dB. Associated with the RoT level, the cell or sector loading is often used to represent the current loading situation in the system. The relationship between RoT and loading Y is often defined as $$RoT = \frac{1}{1-Y}.$$

In other words, if the RoT or the current loading is known, the other can be estimated or determined.

In conventional cellular systems, circuit voice has been the dominant application plus a small amount of data usage. Since the circuit voice has a constant traffic characteristic and transmission format, the RoT or loading estimation due to voice traffic is rather straightforward. Call admission control based on loading and RoT measurement for voice and short data calls could be designed to maintain the system stability. However, in 3G wireless systems, multimedia services have become the emerging services with certain QoS requirements. Further more, enhancements such as Hybrid Automatic Repeat request (HARQ) and rate control techniques have been made to improve the transmission and spectrum efficiency. These features have made the radio resource management more complicated in a CDMA system. Designing an efficient call admission control mechanism is a challenging task.

As an example, consider the current radio resource management scheme in the 1xEV-DO Revision A system. The reverse link is mostly interference-limited and the capacity bottleneck. Each mobile user communicates with one base station or sector (in simplex mode) or multiple base stations or sectors (in soft handoff modes). For each mobile user, there are multiple channels, such as the reverse link traffic channel which transmits the data traffic, the pilot channel, the DRC (Data Rate Control) channel, the DSC (Data Source Control) channel and RRI (Reverse Rate Indication) channel. The pilot and other overhead channels (DRC, DSC, RRI, etc.) are always active regardless of whether there is data transmitting over the traffic channel. On the traffic channel, information bits are communicated in at least one encoder packet (EP) with different sizes. The EP is divided into multiple subpackets or subframes and each subpacket or subframe is the basic transmission unit which is sent over multiple slots (a time unit). Each subpacket or subframe contains the complete information of the EP when successfully received. HARQ technique is employed. Subpackets or subframes can be transmitted with multiple times until the original EP is successfully decoded by the base station. The maximum number of transmissions for each specific EP is usually a fixed number, for example, four times. However, the base station can control the actual number of transmission times using a known power control method.

In the EVDO Rev A system, multi-flow packet applications are supported. A user is allowed to have multiple flows running simultaneously. Each flow corresponds to a particular application. For example, a mobile user can have a VoIP call, while also surfing the internet. Different flows can have very different QoS requirements.

Multiple flows from one user are multiplexed together and sent over the same traffic channel on the reverse link. The transmission rate is associated with the size of the encoder packet (EP). The EP contains information bits from different flows. Once the EP size is determined, a fixed power level relative to the transmission power of the pilot channel, which is the so-called T2P (traffic to pilot) is used as the transmission power level for this particular EP. In other words, the transmission power for the pilot channel is power controlled by the access network (AN). The transmission power for the traffic channel is always set at a fixed T2P level relative to the pilot channel. For a different EP size and the desired number of retransmissions of a given EP, the T2P ratio can be set differently, which is controlled by the AN.

The RoT level at the base station should be controlled under a certain threshold to maintain system stability. The AN measures the RoT level and sends the RAB (Rate Activity Bit) to the mobiles at every slot (a transmission time unit). If the RoT exceeds a threshold, the RAB bit is set to 1. Otherwise it is set to 0. Each mobile keeps tracking the RAB bit and does some calculation to estimate the loading situation. Based on the loading situation and the allowable T2P level that the AN assigned to the mobile, the mobile calculates what possible T2P power room it is allowed to use and determines the corresponding EP size and transmission rate. The mobile then multiplexes information bits from different flows and forms an EP and sends it out using the T2P power level and transmission rate.

A complicated radio resource management has been designed for the EVDO Rev A reverse link. In general, radio resource is measured and controlled via the T2P settings. The AN informs each mobile user of the allowable T2P for each class of flows, and how to adjust its allowable T2P when loading changes. If the loading is high, the allowable T2P will go down. If the loading is low, the allowable T2P will go up. The AN also decides the transmission T2P for each EP size. Each mobile monitors the loading situation and uses its allowable T2P to calculate its possible outflow T2P. The mobile calculates its possible aggregate T2P and then decides the EP size and the actual transmission T2P based on other constraints. Once the EP size is determined, the mobile then multiplexes bits from different flows into the same EP.

Multi-flow packet applications and dynamic resource management render loading estimation much more difficult. In addition, the dynamic T2P adjustment makes new call admission much more complex because a mobile user can adjust its flow multiplexing based on the loading.

There is a need for an improved resource management technique. In particular, there is a need for a technique to control new call admission. It is desirable to provide a new call admission technique that takes into account the complexities introduced by the ability of a mobile station to have multiple flows at varying degrees at different times. There is a need for a call admission control that meets QoS requirements of admitted flows and maintains system stability. Without such a control, admitting new flows may degrade QoS performance for existing flows and reduce overall system efficiency.

SUMMARY OF THE INVENTION

This invention meets the needs discussed above. With an embodiment of this invention, new call admission is based on the flow of the new call and its impact on the overall loading at a base station or sector. The disclosed exemplary embodiments of this invention provide an all new approach to resource management.

An exemplary method of communicating includes determining whether to admit a new call based on a flow of the new call.

The new call may be an all new call from another mobile station entering a sector, for example. Another example new call is a new flow from a mobile station currently being served in a sector using at least one other flow.

One example includes determining a current load. The new call may be admitted if the flow of the new call will introduce a load that will fit within a loading limit. In one example, even if a sector is fully loaded, a new call may be admitted if the flow of the new call has a higher priority than at least one other flow currently contributing to the load. Resources used for lower priority flows are reallocated to a higher priority new call flow and shared among the lower priority flows.

A disclosed example includes discounting or ignoring the loading contribution of lower priority flows when determining whether to admit a new, higher priority flow.

One example includes determining several contributions to a current load. A first portion of the current load is associated with current Expedited Forwarding (EF) flows. A second portion of the current load stems from current Assured Forwarding (AF) flows. A third portion of the current load stems from current Best Effort (BE) flows. A fourth portion of the current load results from overhead channels associated with the calls in the first, second, and third portion of the load. A fifth portion of the current load comes from secondary users who are in a soft handoff mode and other users in other cells, for example. A sixth portion of the current load is from noise, which can usually be assumed to be a constant value. Determining all of these portions and determining a sum of the first through sixth portions provides an indication of the current load of a sector, which facilitates deciding whether to admit a new call.

The various features and advantages of this invention will become apparent to those skilled in the art from the following detailed description of the currently preferred embodiment. The drawings that accompany the detailed description can be briefly described as follows.

DETAILED DESCRIPTION

The disclosed exemplary embodiment provides the ability to determine whether to admit a new call based on a flow of the new call. In this example, a current load of a sector is determined based on the contribution to the load from various flows of various priority levels. At least the primary flow of the new call provides an indication of what contribution the new call will make to the load if the new call were admitted. As described below, the new call may be admitted under various circumstances depending, at least in part, on the flow of the new call.

Figure 1:
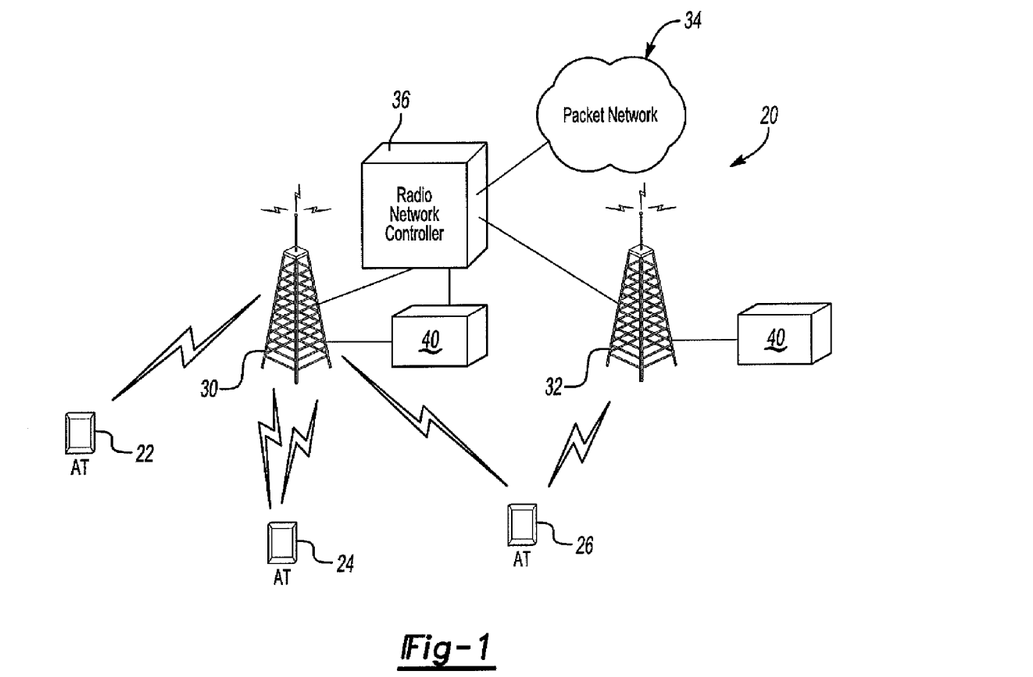
FIG. 1 schematically shows selected portions of a wireless communication system using a new call admission process designed according to an embodiment of this invention.

FIG. 1 schematically shows selected portions of a wireless communication system 20. A plurality of mobile stations (e.g. cell phones) 22, 24 and 26 operate in a known manner to communicate with one or more base stations 30 and 32. A wireless network 34 includes a radio network controller (RNC) 36 and operates in a known manner to facilitate communications between the mobile stations 22, 24 and 26 and another device such as another mobile station, the internet or a conventional telephone.

The illustrated example includes a call admission module (CAM) 40 associated with each base station. In some examples, the CAM 40 may be associated with the RNC 36 and a separate or dedicated module for each base station may not be necessary. One advantage to having a CAM 40 associated with each base station is that it does not require any additional communications along the backhaul between base stations and the RNC 36 for purposes of making new call admission determinations as provided by the example embodiment of this invention.

A "new call" as that term is used in this description includes an all new call from a mobile station requesting new service within a sector, for example. Another example of a new call is a request for service for a new flow from a mobile station currently served within a sector that was using at least one different flow for communications. In other words, a new call may be from a new caller or a new service request from a caller already being served in a sector.

In this example, the CAM 40 determines whether to admit a new call to at least one sector served by the corresponding base station based on the flow of the new call. The following description may interchangeably refer to such a decision making process as being carried out by the CAM 40 or the base station. The CAM 40 may be realized through dedicated circuitry (e.g. an ASIC), at least one processor, software, hardware or a combination of them in a dedicated portion of a base station or through modification of some existing portions of a base station, for example. Given this description, those skilled in the art will realize what combination of components will work best to meet their particular needs.

Figure 2:
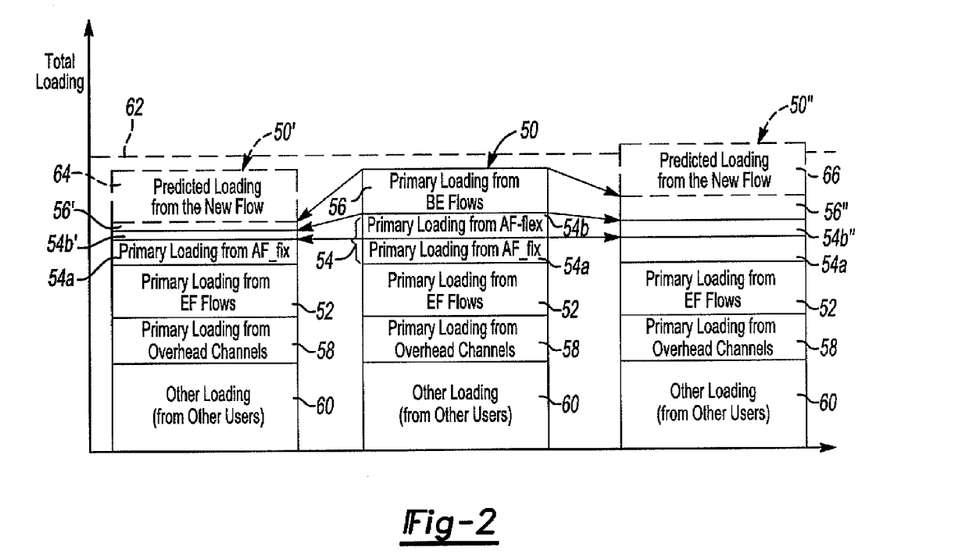
FIG. 2 schematically illustrates an example determination of several example load conditions.

One feature of the example CAM 40 is that it determines a current load of each sector served by the corresponding base station. FIG. 2 illustrates three example loading conditions. A current total load is shown in the middle of the figure at 50. There are various portions of the load resulting from the contribution of different types of flows associated with existing calls in the sector.

A first portion 52 results from expedited forwarding (EF) flows, which have a high priority because they are delay-sensitive. Example EF flows include voice calls or voice over Internet protocol (VoIP) calls. Such EF flows require a certain level of power to get a desired transmission rate and delay, to avoid dropped calls. In other words, the QoS of EF flows requires that such flows have more stringent delay and transmission rate requirement and thus higher priority over other types of flows under different loading conditions.

A second portion 54 of the total load comes from assured forwarding (AF) flows, which have a lower priority than the EF flows because they are relatively less delay-sensitive than the EF flows. Example AF flows includes streaming video applications where the video source data rate can be adjusted to the underlying transmission rate. In other words, when the channel is good, the video stream generates higher source data rate to be sent over to the other end user. When the channel is bad, the video source reduces its data rate so that less amount of data will be sent. In general, for the AF flows, there is a minimum required data rate to maintain a certain level of quality. For example, a streaming video application may require at least 32 kbps transmission rate to get a reasonable good video quality. It can generate a higher data rate (64 kbps) to get a even better video quality if the system permits.

The example second portion 54 comprises a load contribution 54*a* from a fixed portion, AF_fix, of the AF flows and a contribution 54*b* from a flexible portion, AF_flex, to represent the loading with the minimum required data rate and the loading with the extra used data rates, respectively. In general, AF flows have less priority than the EF flows but have higher priority than the best effort (BE) flows.

A third portion 56 of the total load comes from BE flows, which have a lower priority than the EF and AF flows because they are more delay-tolerant. Example BE flows include those associated with surfing the internet or accessing email. BE flows will typically have no minimum transmission rate or delay requirement. In other words, they do not impose stringent QoS requirement that the system must guarantee.

A fourth portion 58 of the current load results from overhead channels such as the pilot and data rate control channel. Once a call is admitted, there is a certain amount of overhead associated with it and that has an impact on the total current load as schematically shown in FIG. 2 at 58.

A fifth portion 60 results from secondary users and users within other sectors. The contribution of the fifth portion 60 to the total current load 50 cannot be controlled within a particular base station because the contribution comes from mobile stations at least partially controlled by another base station. In the example of FIG. 1, the mobile station 24 is in a softer handoff mode where it is communicating with two of the sectors served by the base station 30 at the same time.

If there is at least one sector receiving a correct packet from the mobile, the mobile does not need to increase its transmission power. Therefore, the received power from the mobile can be kept smaller by exploiting this soft handoff gain. If the packet sent from mobile station 24 in this example is received correctly by sector 1 but not sector 2 at the base station 30, then the received signal at sector 2 contributes to the fifth portion 60 of the total current load 50 at sector 2. On the other hand, if the packet from mobile station 24 is received correctly by sector 2 instead of sector 1, the mobile station 24 sends a signal to sector 1 that contributes to the fifth portion 60 of the total current load 50 at sector 1.

The mobile station 26 in the example of FIG. 1 is in a soft handoff between the base stations 30 and 32. The mobile station 26 sends packets to both base stations 30 and 32. Signals decoded successfully by base station 30 but not by base station 32 under these circumstances contribute to the fifth portion 60 of the total load 50 at base station 32.

The loading contribution in the above example is considered as the loading from the secondary users. In another example, the mobile station 22 is communicating only with base station 30. Its signals are also received by base station 32 and thus contribute to the fifth portion 60 of the total current load 50. This loading contribution is considered as part of the fifth portion 60 at base station 32 (i.e., the contribution from other users).

A sixth portion of the total load 50 comprises power associated with thermal noise. Most thermal noise contributions to the total load remain constant for any given base station. That portion is not illustrated as it can be considered constant for given conditions, which do not tend to change during the process of determining whether to admit a new call.

In one example, the fifth portion 60 of the total load 50 is not measured directly. The first, second, third and fourth portions 52, 54, 56 and 58 are measured and calculated in one example. As noted above, the contribution from thermal noise remains essentially constant. Knowing the total load 50 and the other five portions of the load from measurement and calculations, the fifth portion 60 can be determined accordingly.

The CAM 40 determines whether to admit a new call by determining whether the flow of the new call will fit within the capacity of the corresponding sector. The total current load 50 may be such that the new call can be admitted under a variety of circumstances. FIG. 2 schematically shows one example approach where the total load 50' that would result if a new EF/AF flow were admitted, is determined by the CAM 40. If the total load 50' fits within a capacity 62 for the sector, the new flow is admitted in one example. In FIG. 2, an estimated contribution 64 to the total load 50' represents the possible loading from the EF or AF flow of the new call. The total 50' in FIG. 2 does not include the entire contribution corresponding to the BE flow portion 56 and the AF_flex flows 54 shown in the middle of FIG. 2, which contributed to the total current call load 50. That is because in the example on the left side of FIG. 2, the CAM 40 assumes that the loading from the BE flows and the AF flex flows is where additional resource might be shared by the new AF or EF flow. If the new flow is an EF or AF flow, it can potentially grasp resources from the existing BE and AF flows if it were admitted. If the new flow is a BE flow, it can potentially share the resources from the existing BE and AF flows. However, the resource used by the existing EF flows and the fixed portion of the AF flows will not be shared or released to the new flow if it were admitted. BE flows and the AF flows can be handled in a manner that they can share resources within the sector such that they will not hinder the ability to serve the higher priority flows of the existing calls and the new call Comparing the left hand side of FIG. 2 to the middle of that figure, it is apparent that the contribution of the portions 54 and 56 are different and that the total loads 50 and 50' are different. The portions 54*b'* and 56' are smaller than their counterpart portions 54B and 56, respectively. This illustrates the effect of determining to admit a new EF or AF flow and allocating at least some resources previously dedicated to BE or AF flex flows to the new flow. In the example of FIG. 2, using this strategy results in a total call load 50' after admitting a new EF or AF flow that is not significantly different than the current total load 50. At the same time, however, a new flow is accommodated within the capacity limit 62 of the sector. This demonstrates one advantage of the disclosed example for determining whether to admit a new call (or flow) based on the flow of the new call.

In one example, the CAM 40 predicts the potential total loading 50' based on the average data rate requirement and the measurement HARQ transmission efficiency associated with the new flow. In this example, the flow of the new call is an EF flow and the loading from the BE flows (i.e., the third portion 56 of FIG. 2) and AF_flex (i.e., second portion 54B) is discounted (i.e., yielding 56' and 54B') from the total primary loading determination. One example includes discounting or ignoring the portions 54B and 56 whenever determining whether to admit a new EF or AF flow under highly loaded conditions.

One example includes determining a long term and short term predicted total loading and comparing each with a corresponding threshold to determine whether to admit the new EF flow.

In another example shown on the right side of FIG. 2, where the new flow is a BE flow from an existing call that has other EF or AF flows (represented at 52, 54a, 54b" and 56" even if the predicted total loading 50" is above the threshold capacity 62, the BE flow can still be admitted by setting a merge threshold to a very high value such as infinity. The predicted loading from the new BE flow is shown at 66. With the high merge threshold, the new BE flow will not be able to get multiplexed with the existing EF flows, AF flows or both and thus it will not hurt the QoS of the ongoing EF and AF flows. Under these circumstances, even though a sector is already at full capacity, a new BE flow may be admitted based upon the nature of the flow of the new call where that flow has a quality of service (QoS) requirement that allows it to share resources as they become available within the sector without interfering with the ability to meet the QoS requirements for ongoing EF and AF flows in that sector. When the sector becomes less loaded, the admitted BE flow will be able to get served eventually.

Figure 3:
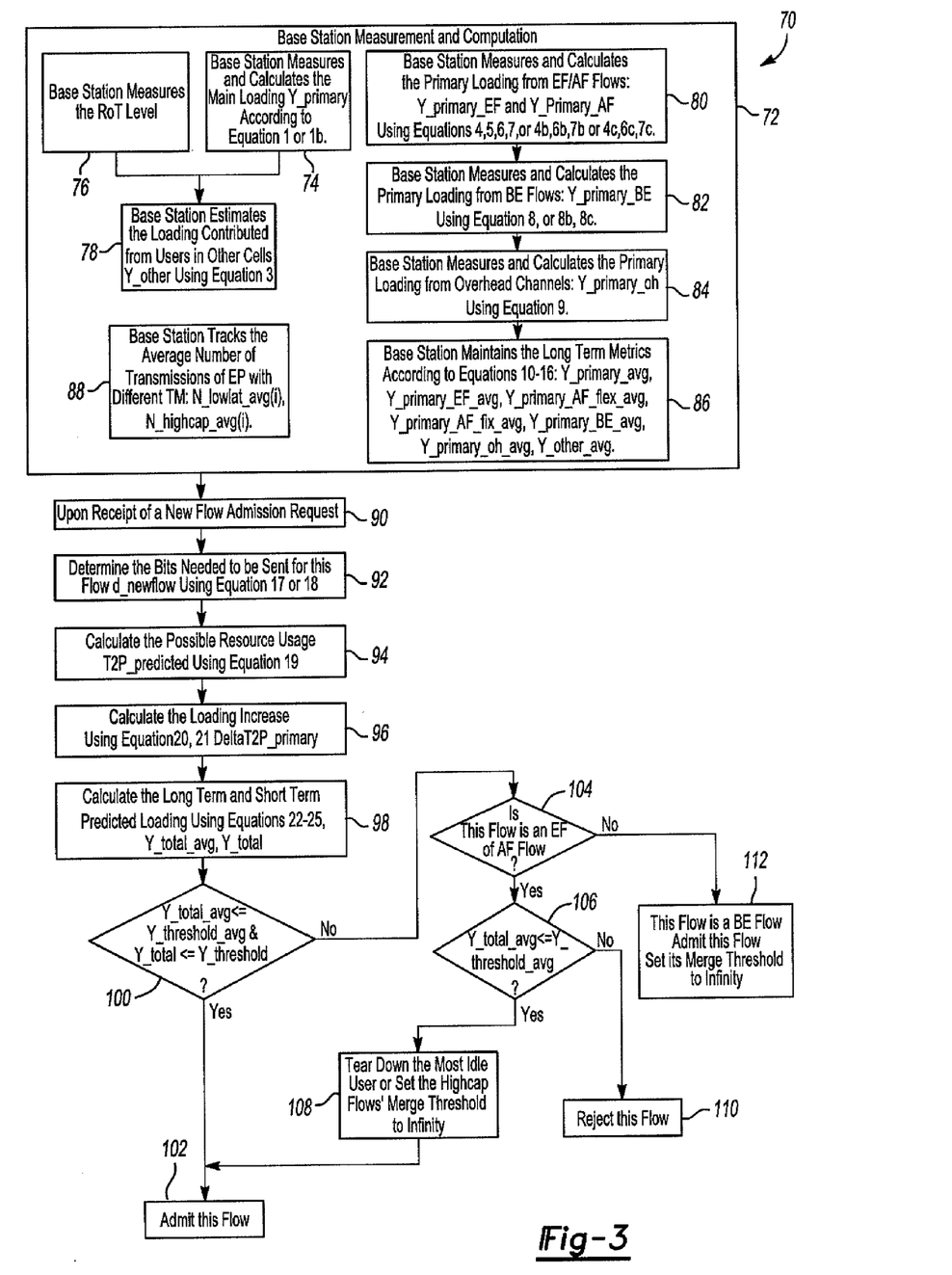
FIG. 3 is a flow chart diagram summarizing one example approach.

FIG. 3 includes a flowchart diagram summarizing one example approach for admitting a new call based upon the flow of the new call. The flow chart 70 begins at 72 where the CAM 40, the base station or both determine a plurality of factors. At 74, the base station determines the primary loading currently experienced for a given sector. In one example, the following equation describes the relationship used to determine a current primary loading level:

$$Y_{primary} = \sum_{i=1}^{K_u} \left(\frac{E_{cp}}{I_0}\right)_i (1 + T2P_{OverheadCH} + a_1 \cdot T2P_{TrafficCH\_i}) \quad \text{Equation 1}$$

where $K_u$ is the number of connected users in the sector; $E_{cp}$ is the pilot energy per chip; $I_0$ is the total received power density; $T2P_{OverheadCH}$ is the traffic to pilot ratio of the overhead channels; $T2P_{TrafficCH\_i}$ is the traffic to pilot ratio of the traffic channel for user i; $a_i$ is the activity indicator of user i, and $a_i=0$ or $1$. The activity factor includes source activity and channel activity due to HARQ operation.

The primary loading represents the loading contribution from all the connected users (including users in soft handoff), which can be measured and computed. In one example, if a connected user's packet can not be detected or decoded, the user's loading contribution from the traffic channel will not be included in the primary loading calculation. However the loading contribution from those undetected packets will be included in the other loading metric (i.e., 60 in FIG. 2).

For purposes of discussion, assume that there are Ku existing mobile users in each sector. Each user can have multiple flows simultaneously sending data to the access network 34. Each flow corresponds to a particular application and has a QoS profile associated with it. The QoS profile indicates each flow's QoS requirement such as minimum data rate, delay requirement, etc. The access network (AN) is aware of each flow's QoS requirement. For simplicity, assume that each flow has two QoS parameters: (1) Data rate requirement of user i and flow id: Rreq(i, fid), which can be a minimum rate or average rate depending on the QoS profile; and (2) Delay requirement, which may be one of expedited forwarding (EF), Assured forwarding (AF) or best effort (BE).

This example includes two types of transmission mode, low latency (LowLat) and High capacity (HighCap). The AN maintains a T2P table for different EP size and transmission mode and informs each mobile station, accordingly. Usually, the EF and AF flows will use a low latency (LowLat) transmission mode, while the BE flows will use a high capacity (HighCap) transmission mode. When there are mixed flows using LowLat and HighCap modes, usually the LowLat transmission mode will be used. As a result, the BE flows will be sent with the EF flows using the LowLat transmission mode.

The T2P ratio, $T2P_{TrafficCH\_i}$, is determined by the specific resource management scheme. It indicates the current resource usage consumed by a particular user. The actual value of $T2P_{TrafficCH\_i}$ mainly depends on the aggregated flows' QoS requirement and traffic characteristic, each flow's allowable T2P ratio plus other constraints. When a new flow is admitted from user i, user i's actual $T2P_{TrafficCH\_i}$ usage will be adjusted. In general, if the current loading is low, the system can allocate more resource for this user and thus the $T2P_{TrafficCH\_i}$ tends to be higher. If the current loading is high already, $T2P_{TrafficCH\_i}$ initially may be higher than before and trigger an overload reaction. As a result, other users' $T2P_{TrafficCH}$ usage will be reduced and $T2P_{TrafficCHi}$ usage will be reduced from the initial high value and reach a stage which can be higher or lower than the value before admitting the new flow.

The following discussion uses the following notation:
Number of users: $K_u$;
User index: i, i=1, ..., $K_u$;
Number of flows for user i: N_flows(i);
Flow id: fid, fid=1, ..., $N_{\_flows(i)}$;
EP size of user i: EP(i); and
T2P ratio: $T2P_{TrafficCH\_i}$, which is a function of the EP size and transmission mode (LowLat or HighCap.)

In one example, the primary loading is updated every subframe. The pilot strength $$\frac{E_{cp}}{I_0}$$

is measured directly from an ASIC board in one example. All connected user's pilot strength is used for the loading calculation. If the pilot strength $$\frac{E_{cp}}{I_0}$$

of each user is not available from the ASIC, an estimated value can be used for the loading calculation. The T2P for overhead channels T2P$_{OverheadCH}$ is set and known for each sector. The T2P for traffic channel T2P$_{TrafficCH\_i}$ is determined by the size of the received EP(i) and its transmission mode (whether it is LowLat or HighCap.)

The activity indicator $a_i$ can be measured directly from an ASIC board including the receiver of the traffic channel. In one example, $a_i$ is determined by the time an EP is received. When receiving a successfully decoded EP at subframe m, the number of transmissions of this EP, n is decoded. Therefore, at subframe m, m−4, . . . m−4(n−1), the EP is transmitted and thus the activity indicator is 1 at those subframe time instances.

Each base station maintains an array for the primary loading calculation. Assuming the maximum number of transmissions is N and the interval between each transmission of the same EP is M. The size of the array would be N×M. For example, for N=4 and M=3, an array of size 12 is used. At time instance m (subframe index), the primary loading of the previous 12 subframes (m, m−1, . . . , m−11) will be calculated and updated.

When a user is in softer handoff (connected with multiple sectors in the same cell), the EP may be successfully decoded at another sector instead of the current sector. In this case, the loading from the traffic channel cannot be calculated directly from the EP. If other sectors in the same cell can pass the EP information (size, transmission mode, etc.) to the current sector, the loading contribution can be counted. If the secondary sector is in another cell (soft handoff case), the current sector would not be able to count the loading contribution in the primary loading calculation. Instead, this loading is included in the other loading portion 58, for example.

The base station determines the RoT at 76. The RoT is defined as $$RoT = \frac{1}{1-(Y_{primary}+Y_{other})} = \frac{1}{1-(1+f)Y_{primary}} \quad \text{Equation 2}$$

In this example, the interference from users in other cells/sectors is considered as an equivalent other loading, $Y_{other}$. The ratio of other loading to the primary loading is often assumed as the other cell interference ratio f.

The equivalent loading from other users is determined in this example at 78 using:

$$Y_{other} = 1 - Y_{primary} - \frac{1}{RoT} \quad \text{Equation 3}$$

The calculation of $Y_{other}$ is updated in a delayed version. In other words, at time instance m, the $Y_{other}$ subframe m−12 is updated, since the primary loading is updated for the entire 12 subframes.

Besides monitoring the total primary loading, the CAM 40 tracks the loading contribution for each sector from flows characterized by QoS parameters. For example, the loading from EF, AF flows and BE flows are determined at 80 and 82 as follows.

$$Y_{primary\_EF} = \sum_{i=1}^{K_u} \left(\frac{E_{cp}}{I_0}\right)_i \left(a_i \cdot T2P_{TrafficCH\_i} \cdot \sum_{fid \in \{EF\ flows\}} \frac{d_{fid}}{EP_i}\right) \quad \text{Equation 4}$$

where $d_{fid}$ is the number of bits in the EP from flow fid.

For the AF flows in this example, the loading comprises two parts:

$$Y_{primary\_AF} = Y_{primary\_AF\_fix} + Y_{primary\_AF\_flex} \quad \text{Equation 5}$$

$$Y_{primary\_AF\_flex} = \quad \text{Equation 6}$$

$$\sum_{i=1}^{K_u} \left(\frac{E_{cp}}{I_0}\right)_i \left(a_i \cdot T2P_{TrafficCH\_i} \cdot \sum_{fid \in \{AF\ flows\}} g_{fid} \cdot \frac{d_{fid}}{EP_i}\right)$$

$$Y_{primary\_AF\_fix} = \sum_{i=1}^{K_u} \left(\frac{E_{cp}}{I_0}\right)_i \quad \text{Equation 7}$$

$$\left(a_i \cdot T2P_{TrafficCH\_i} \cdot \sum_{fid \in \{AF\ flows\}} (1 - g_{fid}) \cdot \frac{d_{fid}}{EP_i}\right)$$

where $$g_{fid} \equiv \frac{R_{AFi} - R_{reqi}}{R_{AFi}}, 0 \leq g_{fid} \leq 1$$

$$R_{AFi} = \frac{d_{AFi}}{T_{sub-frame}}, d_{AFi} = \left(1 - \frac{1}{T}\right)d_{AFi} + \frac{1}{T}d_i$$

$g_{fid}$ is the portion of the AF flow that exceeds the required rate $R_{reqi}$; $R_{AF_i}$ is the measured rate used by this AF flow; and $d_{AF_i}$ is an average number of bits sent by this flow.

The loading from the BE flows is calculated as follows:

$$Y_{primary\_BE} = \sum_{i=1}^{K_u} \left(\frac{E_{cp}}{I_0}\right)_i \left(a_i \cdot T2P_{TrafficCH\_i} \cdot \sum_{fid \in \{BE\ flows\}} \frac{d_{fid}}{EP_i}\right) \quad \text{Equation 8}$$

The primary loading from different flows will be updated in an N×M array, similar to that used for the primary loading calculation.

The loading due to overhead channels is determined at 84, using:

$$Y_{primary\_oh} = \sum_{i=1}^{K_u} \left(\frac{E_{cp}}{I_0}\right)_i (1 + T2P_{OverheadCH}) \quad \text{Equation 9}$$

Since the overhead channel is always on, the loading is updated every subframe.

As shown at 86, the CAM 40 maintains the following long term metrics for each sector:

a) Average primary loading $$Y_{primary\_avg} = \left(1 - \frac{1}{T}\right)Y_{primary\_avg} + \frac{1}{T}Y_{primary} \quad \text{Equation 10}$$

b) average primary loading from EF flows $$Y_{primary\_EF\_avg} = \left(1 - \frac{1}{T}\right)Y_{primary\_EF\_avg} + \frac{1}{T}Y_{primary\_EF} \quad \text{Equation 11}$$

c) average primary loading from AF flows $$Y_{primary\_AF\_flex\_avg} = \left(1 - \frac{1}{T}\right)Y_{primary\_AF\_flex\_avg} + \frac{1}{T}Y_{primary\_AF\_flex} \quad \text{Equation 12}$$

$$Y_{primary\_AF\_fix\_avg} = \left(1 - \frac{1}{T}\right)Y_{primary\_AF\_fix\_avg} + \frac{1}{T}Y_{primary\_AF\_fix} \quad \text{Equation 13}$$

d) Average primary loading from BE flows $$Y_{primary\_BE\_avg} = \left(1 - \frac{1}{T}\right)Y_{primary\_BE\_avg} + \frac{1}{T}Y_{primary\_BE} \quad \text{Equation 14}$$

e) Average primary loading from other overhead channels $$Y_{primary\_oh\_avg} = \left(1 - \frac{1}{T}\right)Y_{primary\_oh\_avg} + \frac{1}{T}Y_{primary\_oh} \quad \text{Equation 15}$$

f) Average loading from other users in other cells $$Y_{other\_avg} = \left(1 - \frac{1}{T}\right)Y_{other\_avg} + \frac{1}{T}Y_{other} \quad \text{Equation 16}$$

The base station tracks the average number of EP transmissions with a different transmission mode (for example, LowLat or HighCap mode) for each user in each sector at 88, yielding:

$$N_{lowlat\_avg}(i) \text{ and } N_{highcap\_avg}(i)$$

The box at 90 indicates receipt of a new call admission request at a base station. The corresponding CAM 40 proceeds to determine whether to admit the new call based on the flow of the new call.

At 92 the CAM 40 determines the bits needed to be sent in an EP from this flow's transmission rate requirement. The transmission rate requirement can be the minimum rate or average rate, depending on the QoS profile.

If this flow is a low latency (EF or AF) flow, or if there are other low latency flows from the same user, $$d_{newflow} = R_{req\_newflow} \cdot T_{subframe} \cdot N_{lowlat\_avg} \quad \text{Equation 17}$$

otherwise $$d_{newflow} = R_{req\_newflow} \cdot T_{subframe} \cdot N_{highcap\_avg} \quad \text{Equation 18}$$

where $T_{subframe}$ is the subframe duration of each transmission; $R_{req\_newflow}$ is the transmission rate requirement of this new flow; and $N_{lowlat\_avg}$ or $N_{highcap\_avg}$ is the measured average number of transmissions for the different transmission modes.

The CAM 40 then determines the possible resource usage for this new flow in terms of T2P level at 94:

$$T2P_{predicted} = d_{newflow}/T2PConversionFactor \quad \text{Equation 19}$$

where T2PConversionFactor is the number of bits per T2P consumed, which is maintained by the AN and available for resource management.

Similar to what is shown in FIG. 3, the CAM 40 next determines the potential loading increase if admitting this new flow at 96. If this flow is from an existing user, then:

$$\Delta Y_{primary} = \frac{E_{cp}}{I_0} \cdot T2P_{predicated} \quad \text{Equation 20}$$

If this new flow is from a new primary user, then:

$$\Delta Y_{primary} = \frac{E_{cp}}{I_0} \cdot (1 + T2P_{overheadCH} + T2P_{predicated}) \quad \text{Equation 21}$$

The CAM 40 continues to determine whether to admit the new call. In this example, that decision not only depends on the effect of the new flow on the total loading but also on the type of new flow. Different flow types may be admitted under different circumstances without compromising the QoS requirements of various existing flows. The CAM 40 determines long term and short term predicted loading at 98. Different relationships are used for different flow types. If the new flow is an EF or AF flow, which will be transmitted in the LowLat mode, the CAM 40 determines the long term and short term total predicted loading (if admitting this flow) using:

$$\begin{aligned}Y_{total\_avg} = &\, Y_{primary\_EF\_avg} + Y_{primary\_AF\_fix\_avg} + \\ & Y_{primary\_oh\_avg} + \Delta Y_{primary} + Y_{other\_avg} + \\ & w_{EF/AF\_AF} \cdot Y_{primary\_AF\_flex\_avg} + \\ & w_{EF/AF\_BE} \cdot Y_{primary\_BE\_avg}\end{aligned} \quad \text{Equation 22}$$

$$\begin{aligned}Y_{total} = &\, Y_{primary\_EF} + Y_{primary\_AF\_fix} + Y_{primary\_oh} + \\ & \Delta Y_{primary} + Y_{other} + w_{EF/AF\_AF} \cdot Y_{primary\_AF\_flex} + \\ & w_{EF/AF\_BE} \cdot Y_{primary\_BE}\end{aligned} \quad \text{Equation 23}$$

where $w_{EF/AF\_AF}$ is a positive real number between [0,1] and used to weigh or discount AF_flex loading when considering EF/AF flow admission; $W_{EF/AF\_BE}$ is a positive real number between [0,1] and used to weigh or discount BE loading when considering EF/AF flow admission.

If the new flow is a BE flow, which will be transmitted in the HighCap mode, the CAM 40 determines the long term and short term total predicted loading (if admitting this flow) using:

$$Y_{\text{total\_avg}} = Y_{\text{primary\_EF\_avg}} + Y_{\text{primary\_AF\_fix\_avg}} + \quad \text{Equation 24}$$
$$Y_{\text{primary\_oh\_avg}} + \Delta Y_{\text{primary}} + Y_{\text{other\_avg}} +$$
$$w_{\text{BE\_AF}} \cdot Y_{\text{primary\_AF\_flex\_avg}} +$$
$$w_{\text{BE\_BE}} \cdot Y_{\text{primary\_BE\_avg}}$$

$$Y_{\text{total}} = Y_{\text{primary\_EF}} + Y_{\text{primary\_AF\_fix}} + \quad \text{Equation 25}$$
$$Y_{\text{primary\_oh}} + \Delta Y_{\text{primary}} + Y_{\text{other}} +$$
$$w_{\text{BE\_AF}} \cdot Y_{\text{primary\_AF\_flex}} +$$
$$w_{\text{BE\_BE}} \cdot Y_{\text{primary\_BE}}$$

As shown at 100 in FIG. 3, the CAM 40 determines whether $Y_{\text{total\_avg}}$ is less than the corresponding threshold and $Y_{\text{total}}$ is less than the corresponding threshold. If both relationships $Y_{\text{total\_avg}} \leq Y_{\text{threshold\_avg}}$ and $Y_{\text{total}} \leq Y_{\text{threshold}}$ are satisfied, the CAM 40 will admit the new call or flow at 102 because the sector is not at full capacity and resources are available without compromising QoS requirements.

The admission threshold $Y_{\text{threshold\_avg}}$ and $Y_{\text{threshold}}$ can be set differently for different scenarios based on applications. For example, if the new flow is an VoIP application, we can set $Y_{\text{threshold\_avg}} = Y_{\text{threshold\_VoIP}}$. For other applications, we can set $Y_{\text{threshold\_avg}} = Y_{\text{threshold\_others}}$. If the new flow is a handoff flow where the flow was already admitted by other sectors, we can set the threshold to infinity, which means that the handoff flow will always be admitted.

Under some circumstances the long term and short term values of the predicted loading will not be less than or equal to the corresponding thresholds. In this example, the CAM 40 continues at 104 to determine whether the new flow is an EF or AF flow at 104. If the new flow is one of those types of transmission mode (i.e., a LowLat flow), then the CAM 40 continues at 106 to determine whether at least $Y_{\text{total\_avg}} \leq Y_{\text{threshold\_avg}}$.

If the long term predicted loading is less than the threshold, then the base station will effectively tear down the most idle user within the sector who has not transmitted any data within a selected timeframe. Alternatively at 108, the base station changes the merge threshold for existing HighCap flows to a very high value such as infinity. This approach allocates sector resources for the AF or EF flow of the new call and the HighCap or BE flows will not consume resources in a manner that will compromise the QoS requirements of the new flow. The result is admitting the new flow at 102.

If, on the other hand the long term predicted loading is not within the corresponding threshold (i.e., 62 in FIG. 2) at 106, then the new flow is rejected as shown at 110.

When a new flow is a BEflow having a HighCap transmission mode, that flow may be admitted at 112 by setting the merge threshold to infinity to avoid the new flow consuming any resources from existing LowLat flows, which preserves the ability to satisfy the QoS requirements of such LowLat flows. At the same time, system stability is ensured.

Another example includes using the loading from different flows, respectively. Instead of determining short term and long term loading for each flow, only the long term loading is determined based upon the measurement data and used as the admission criteria.

Equations 1, 4, 6, 7 and 8 from the previous example are replaced by equations 1b, 4b, 6b, 7b and 8b below respectively. At any time when a successful EP is decoded, the primary loading determined in this example is not retro-back N×M (12) subframes for updating. Instead the aggregate loading effect (combining the T2P from all the transmissions) will be determined from the relationships as shown below, where $n_i$ is the number of transmissions for a successfully decoded EP from user i.

$$Y_{\text{primary}} = \quad \text{Equation 1b}$$
$$\sum_{i=1}^{K_u} \left(\frac{E_{cp}}{I_0}\right)_i (1 + T2P_{\text{OverheadCH}} + a_i \cdot n_i \cdot T2P_{\text{TrafficCH\_i}})$$

$$Y_{\text{primary\_EF}} = \quad \text{Equation 4b}$$
$$\sum_{i=1}^{K_u} \left(\frac{E_{cp}}{I_0}\right)_i \left(a_i \cdot n_i \cdot T2P_{\text{TrafficCH\_i}} \cdot \sum_{fid \in \{EF\ flows\}} \frac{d_{fid}}{EP_i}\right)$$

$$Y_{\text{primary\_AF\_flex}} = \quad \text{Equation 6b}$$
$$\sum_{i=1}^{K_u} \left(\frac{E_{cp}}{I_0}\right)_i \left(a_i \cdot n_i \cdot T2P_{\text{TrafficCH\_i}} \cdot \sum_{fid \in \{AF\ flows\}} g_{fid} \cdot \frac{d_{fid}}{EP_i}\right)$$

$$Y_{\text{primary\_AF\_fix}} = \sum_{i=1}^{K_u} \left(\frac{E_{cp}}{I_0}\right)_i \left(\begin{array}{c} a_i \cdot n_i \cdot T2P_{\text{TrafficCH\_i}} \cdot \\ \sum_{fid \in \{AF\ flows\}} (1 - g_{fid}) \cdot \frac{d_{fid}}{EP_i} \end{array}\right) \quad \text{Equation 7b}$$

$$Y_{\text{primary\_BE}} = \quad \text{Equation 8b}$$
$$\sum_{i=1}^{K_u} \left(\frac{E_{cp}}{I_0}\right)_i \left(a_i \cdot n_i \cdot T2P_{\text{TrafficCH\_i}} \cdot \sum_{fid \in \{BE\ flows\}} \frac{d_{fid}}{EP_i}\right)$$

In previous examples of the primary loading calculation, every received EP will be inspected to obtain the required information. Another example is to use the feedback information from the Radio Network Controller (RNC) 36 for the loading calculation. Per X subframes, the RNC 36 sends feedback information of each user $\{d_{EF\_fid}, d_{AF\_fid}, d_{BE\_lowlat\_fid}, d_{BE\_highcap\_fid}\}$, $N_{\text{lowlat\_avg}}$ and $N_{\text{highcap\_avg}}$, where d indicates the number of bits received from a particular flow. For BE flows, the received bits from different transmission modes are separately recorded. In one example, the loading calculation of Equations 4, 6, 7, and 8 will be replaced by Equation 4c, 6c, 7c and 8c, respectively. The rest of the calculations remain the same.

$$Y_{\text{primary\_EF}} = \sum_{i=1}^{K_u} \left(\frac{E_{cp}}{I_0}\right)_i \left(\frac{\sum_{fid \in \{EF\ flows\}} \frac{d_{EF\_fid}}{X} \cdot N_{\text{lowlat\_avg}}}{T2PConversionFactor_{\text{lowlat}}}\right) \quad \text{Equation 4c}$$

$$Y_{\text{primary\_AF\_flex}} = \quad \text{Equation 6c}$$
$$\sum_{i=1}^{K_u} \left(\frac{E_{cp}}{I_0}\right)_i \left(\frac{\sum_{fid \in \{AF\ flows\}} g_{fid} \cdot \frac{d_{fid}}{X} \cdot N_{\text{lowlat\_avg}}}{T2PConversionFactor_{\text{lowlat}}}\right)$$

$$Y_{\text{primary\_AF\_fix}} = \quad \text{Equation 7c}$$
$$\sum_{i=1}^{K_u} \left(\frac{E_{cp}}{I_0}\right)_i \left(\frac{\sum_{fid \in \{AF\ flows\}} (1 - g_{fid}) \cdot \frac{d_{fid}}{X} \cdot N_{\text{lowlat\_avg}}}{T2PConversionFactor_{\text{lowlat}}}\right)$$

-continued $$Y_{primary\_BE} = \sum_{i=1}^{K_u} \left(\frac{E_{cp}}{I_0}\right)_i \left( \sum_{fid \in \{BE\ flows\}} \left( \frac{\frac{d_{BE\_lowlat\_fid}}{X} \cdot N_{lowlat\_avg}}{T2PConversionFactor_{lowlat}} + \frac{\frac{d_{BE\_highcap\_fid}}{X} \cdot N_{highcap\_avg}}{T2PConversionFactor_{highcap}} \right) \right)$$

Equation 8c

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising:
using a base station for serving at least one sector; determining whether to admit a new call to the sector based on a flow of the new call; determining that the flow of the new call is a low priority flow; admitting the new call; and setting a merge threshold of the low priority flow of the new call and any existing low priority flows to a high value, the high value ensuring that the low priority flow will not interfere with an ability to meet quality of service requirements for higher priority flows.

2. The method of claim 1, comprising:
determining whether the flow of the new call will fit within a capacity of the sector; and
admitting the new call to the sector if the flow of the new call will fit within the capacity of the sector.

3. The method of claim 2, comprising:
determining a current load of the sector;
determining a contribution of the flow of the new call to the load; and
determining whether the current load and the contribution of the flow of the new call fit within the capacity.

4. The method of claim 3, wherein determining the current load of the sector comprises determining a contribution to the current load from each of a plurality of classes of flows.

5. The method of claim 4, comprising determining whether the flow of the new call can utilize at least some of the capacity currently associated with at least one of the classes of flows of the current load in place of at least some of the flows of the at least one class.

6. The method of claim 1, comprising admitting a second new call if the flow of the second new call has a higher priority than at least one current flow class or a determined current load and the flow of the second new call fit within the capacity of the sector.

7. The method of claim 1, comprising:
determining a priority of the flow of a second new call; and
admitting the second new call if the flow of the second new call is in a high priority category.

8. The method of claim 7, comprising allocating at least some of the capacity previously allocated to at least one flow having a lower priority for the second new call.

9. The method of claim 1, comprising determining a resulting load based on admitting a second new call including discounting a portion of the load resulting from at least one low priority flow if the flow of the second new call is a high priority flow.

10. The method of claim 1, comprising determining the flow of the new call including inspecting an encoder packet of the new call.

11. The method of claim 1, comprising determining the flow of the new call including obtaining information regarding an encoder packet of the new call from a radio network controller that processed the encoder packet.

12. The method of claim 1, comprising:
determining a class of the flow of the new call; and
using the determined class for determining whether to admit the new call.

13. The method of claim 12, comprising:
determining a current load of the sector by determining a contribution to the current load of each of a plurality of flow classes; and
considering the contribution to the current load of the determined class of the flow of the new call when determining whether to admit the new call.

14. A method of communicating, comprising:
using a base station for serving at least one sector; determining whether to admit a new call based on a flow of the new call; and determining that the flow of the new call is a low priority flow; admitting the new call; and setting a merge threshold for at least one low priority flow and any existing lows priority flow to a high value that ensures that the low priority flow will not interfere with an ability to satisfy a quality of service requirement of at least one other higher priority flow.

15. The method of claim 14, comprising:
setting the merge threshold for the at least one low priority flow to infinity, thereby ensuring that the low priority flow will not interfere with an ability to satisfy the quality of service requirement of any other higher priority flows if the new call is admitted.

* * * * *